(12) United States Patent
Choi et al.

(10) Patent No.: US 7,693,904 B2
(45) Date of Patent: Apr. 6, 2010

(54) METHOD AND SYSTEM FOR DETERMINING RELATION BETWEEN SEARCH TERMS IN THE INTERNET SEARCH SYSTEM

(75) Inventors: Jae-Keol Choi, Seoul (KR); Sangjune Moon, Seoul (KR); Dongwook Kim, Kyunggi-do (KR)

(73) Assignee: NHN Corporation, Seongnam-si (KR)

( * ) Notice: Subject to any disclaimer, the term of this patent is extended or adjusted under 35 U.S.C. 154(b) by 132 days.

(21) Appl. No.: 11/917,759

(22) PCT Filed: Jun. 16, 2006

(86) PCT No.: PCT/KR2006/002323

§ 371 (c)(1),
(2), (4) Date: Dec. 14, 2007

(87) PCT Pub. No.: WO2007/001128

PCT Pub. Date: Jan. 4, 2007

(65) Prior Publication Data

US 2008/0201297 A1    Aug. 21, 2008

(30) Foreign Application Priority Data

Jun. 27, 2005    (KR) ............. 10-2005-0055750

(51) Int. Cl.
*G06F 7/06* (2006.01)
(52) U.S. Cl. ................ 707/738; 707/E17.017; 707/17.108
(58) Field of Classification Search ........... 707/1, 707/3, 2, E17.017, E17.108, 705, 736, 738
See application file for complete search history.

(56) References Cited

U.S. PATENT DOCUMENTS

| 6,006,225 | A  | * | 12/1999 | Bowman et al. ............... 707/5 |
| 6,169,986 | B1 |   | 1/2001  | Bowman et al. |
| 6,208,988 | B1 | * | 3/2001  | Schultz ........................ 707/5 |
| 6,490,577 | B1 | * | 12/2002 | Anwar ......................... 707/3 |
| 6,772,150 | B1 |   | 8/2004  | Whitman et al. |
| 2002/0010625 | A1 | * | 1/2002 | Smith et al. .................. 705/14 |
| 2005/0080780 | A1 | * | 4/2005 | Colledge et al. ............... 707/4 |
| 2006/0010105 | A1 | * | 1/2006 | Sarukkai et al. .............. 707/3 |
| 2006/0212265 | A1 | * | 9/2006 | Amitay et al. ............. 702/182 |

FOREIGN PATENT DOCUMENTS

| JP | 10-011458 | 1/1998 |
| KR | 10-2001-0095721 | 11/2001 |
| KR | 10-2002-0003915 | 1/2002 |
| KR | 10-2004-0063641 | 7/2004 |

* cited by examiner

*Primary Examiner*—Tim T. Vo
*Assistant Examiner*—Shiow-Jy Fan
(74) *Attorney, Agent, or Firm*—H.C. Park & Associates, PLC

(57) ABSTRACT

A method of determining a relation between search queries and a system for executing the method are provided. A method of determining a relation between search queries, comprises: maintaining a database including a search session and search queries received from a user terminal during the search session; determining numbers of search sessions where first and second search queries are received during a predetermined time interval; calculating conditional probability based on the determined numbers of search sessions; calculating correlation by using a total number of search sessions and said numbers of search sessions; and determining a relation between said search queries based on said calculated conditional probability and said calculated correlation.

26 Claims, 8 Drawing Sheets

FIG. 4

| SEARCH SESSION IDENTIFIER (401) | SEARCH QUERY | | | |
|---|---|---|---|---|
| SESSION ID 1 | PARKCHANHO | MAJOR LEAGUE | BASEBALL | ... |
| SESSION ID 2 | MOVIE | BOX OFFICE | CINEMA | ... |
| SESSION ID 3 | CHABUMGUN | CHADURI | SOCCER | ... |
| ... | ... | ... | ... | ... |

| SEARCH SESSION IDENTIFIER | SEARCH QUERY | | | |
|---|---|---|---|---|
| 56 | 18758 | 18760 | 18761 | ... |
| 448 | 19700 | 19701 | 19702 | ... |
| 14501 | 20101 | 20102 | 20103 | ... |
| ... | ... | ... | ... | ... |

| FIRST, SECOND SEARCH QUERIES (701) | RELATED TERM 1 | RELATED TERM 2 | RELATED TERM 3 | ... |
|---|---|---|---|---|
| GREAT COOK, LEEYOUNGAE | JIJINHEE | DRAMA | MBC | ... |
| SEOHEE, LAND | END OF LAND | STORY OF LAND | CHOISEOHEE | ... |
| PARKCHANHO, TEXAS | DODGERS | MAJOR LEAGUE | BASEBALL | ... |
| ... | ... | ... | ... | ... |

METHOD AND SYSTEM FOR DETERMINING RELATION BETWEEN SEARCH TERMS IN THE INTERNET SEARCH SYSTEM

CROSS REFERENCE TO RELATED APPLICATION

This application is a U.S. National Phase Application of International Application PCT Application No. PCT/KR2006/002323 filed on Jun. 16, 2006, which claims the benefit of priority from Korean Patent Application No. 10-2005-0055750 filed on Jun. 27, 2005. The disclosures of International Application PCT Application No. PCT/.KR2006/002323 and Korean Patent Application No. 10-2005-0055750 are incorporated herein by reference.

TECHNICAL FIELD

The present invention relates to a method and system for determining a relation between a plurality of search queries, and more particularly, to a method and system which can determine a relation between a plurality of search queries by counting and using a number of search sessions where each of the search queries is inputted, and a number of search sessions where a pair of search queries including the search query are inputted, and also additionally using click rate information of each of the search queries.

BACKGROUND ART

When a search query is inputted from a user, a search service system providing search services generally provides the user with search results corresponding to the search query (for example, websites including the search query, articles including the search query, and images including the search query as a file name).

A recent search service system provides a related search query providing service which extracts search queries associated with a search query which is inputted from a user, and provides the user with the extracted search queries, so that the user may quickly and accurately retrieve the user's desired information. Specifically, the recent search service system generally provides the user with different search results according to the inputted search query. As an example, a search result which is generated when the user inputs a term "car" may be different from the search result which is generated when the user inputs a term "vehicle". Accordingly, a user attempts to input a search query which is more related to the user's desired information, so as to acquire the desired information. However, the searcher may not conceive a more closely related search query. Accordingly, the recent search service system provides a service which provides the user with search queries that are related to the user's inputted search query, using the search query and statistical information, and thereby, enables the user to retrieve the user's desired information using another search query.

Here, the related search query may designate, for example, a search query which corresponds to a superordinate concept or a subordinate concept of the user's input search query (for example "foreign language" when "Japanese" is inputted, and conversely, "Japanese" when "foreign language" is inputted), a search query which has a synonymous relation to the user's input search query (for example "bookstore" when "bookshop" is inputted), a search query which has an equivalent relation to the user's input search query (for example "tag" when "tail" is inputted), and a search query which has a relation to the user's input search query in an aspect of meaning (for example "saw, seen, seeing" when "see" is inputted).

Also, the related search query may designate a search query which has a relation from various viewpoints. As an example, when search query "Parkchanho" is inputted, the related search query may designate a search query, for example, his occupation "baseball", his baseball league "major league", his university "Hanyang university", his baseball team "Texas rangers", a different Korean baseball player on the same baseball team "Kimbyunghyun", and the like.

However, in a related search query providing service according to a conventional art, a service operator must classify other search queries related to a search query, and store each of the classified search queries. Accordingly, the service operator may suffer from temporal losses and economic losses.

Also, a simultaneous occurrence class method where a relation between terms is defined as a probability that the terms may simultaneously occur, a document class method where documents are classified into groups, and terms usually appearing in each of the groups are defined as related words, and a grammar class method where a relation between terms is understood using a simultaneously occurring characteristic between a linguistic knowledge and a document are suggested to extract a related search query with less time and costs. However, the above-described methods consider not the meaning relation between the terms, but only a statistical relation between the terms. Accordingly, the user may not understand the relation between the extracted related search queries.

To solve the inconveniences described above, the Korean Patent Registration No. 10-0372078 disclosed "a method for related terms searching" which can generate a thesaurus using a query log received from a user, and enables the user to retrieve related terms in an aspect of meaning by using the generated thesaurus.

The method for related term searching registers a portion of search queries, which have been inputted within a predetermined session from the user's input queries, as related terms, and thereby generates the thesaurus. Also, when the user inputs a query into a related terms searching apparatus, the method for related term searching identifies related terms of the query, arranges the same, and provides the user with the arranged related terms.

However, the method for related terms searching can determine the relation between queries using the query log which was received within a certain session, but still includes problems of the conventional art, as follows.

Specifically, even in the case of using the method for related terms searching, problems still remain, such as 1) the user may not understand a relation between extracted related terms since all the related terms that occur at least once in an identical session are registered as the related terms, 2) all the terms that accidentally occur in an identical session are registered as the related terms since the related terms are not registered by systematically analyzing accumulated data during a predetermined period, 3) an unnecessary amount of time is consumed to understand the relation between search queries by adopting a method of extracting a term from a keyword although the user generally inputs the search query, not the keyword, and 4) a great amount of related terms may exist by registering all the terms that occur at least once in an identical session, as the related terms.

Consequently, even in the case of the method for related terms searching, it is still likely to extract a search query which has no relation to the search query which is inputted from a user. Accordingly, a user who desires to quickly and accurately retrieve the user's desired information using a high quality service may not be satisfied.

Accordingly, a new technology which can effectively collect data about a search query inputted from a user, systematically analyze the collected data, and determine a relation between search queries using the analyzed data, and thereby can provide the user with a high quality service is required.

DISCLOSURE OF INVENTION

Technical Goals

The present invention provides a method and system for determining a relation between search queries, which can reduce temporal losses and economic losses that may be caused to a service operator, by constructing a system, and classifying and storing other search queries associated with a search query via the system. Here, the system can effectively collect and analyze data about the search query inputted from the user, and automatically determine the relation between the search queries.

The present invention also provides a method and system for determining a relation between search queries, which can exclude a search query that is not included in a search result, but determined as a related search query since a user inputted the search query in a search session a large number of times, using click rate information of each of the search queries, and also can provide the user with a related search query that can substantially satisfy the search result, by additionally considering a click rate of each of the related search queries, when determining the relation between the search queries.

The present invention also provides a method and system for determining a relation between search queries, which can consider a previously inputted search query before a search query and another search query were inputted, when expanding a target for a relation determination, and determining the relation between the certain search query and another search query, and thereby can determine a relation among at least three search queries, and provide a user with a different related search query even with respect to an identical search query, as the user's query input progresses.

The present invention also provides a method and system for determining a relation between search queries, which can systematically calculate relation index information between search queries, and when a search query is inputted from a user, can extract a more related search query by using the relation index information, and preferentially provide the user with the extracted search query.

The present invention also provides a method and system for determining a relation between search queries, which can extract a related search query that has a substantial meaning relation with a search query and thereby, provide a user with a high quality related search query service, by extracting only systematically preprocessed useful data that users searched, and maintaining an appropriate number of related search queries.

Technical Solutions

According to an aspect of the present invention, there is provided a method of determining a relation between search queries, the method including: maintaining a database comprising a search session and a record about a search query which is received from a user terminal during the search session, the record being generated every predetermined time interval and recorded in the database; recording and maintaining click rate information for each of the search queries in a predetermined storage unit; generating total search session number information by counting a total number of search sessions which is set during the time interval, by referring to the database; generating first search session number information by counting a number of search sessions where a first search query is received during the time interval, and generating second search session number information by counting a number of search sessions where a second search query is received during the time interval, by referring to the database; generating third search session number information by counting a number of search sessions where the first search query and the second search query are received during the time interval, by referring to the database; generating conditional probability information by using the first search session number information and the third search session number information; generating correlation information by using the total search session number information, the first search session number information, the second search session number information, and the third search session number information; querying click rate information of the second search query by referring to the storage unit; and determining a relation between the first search query and the second search query, based on the conditional probability information, the correlation information, and the click rate information.

According to another aspect of the present invention, there is provided a method of determining a relation between search queries, the method including: maintaining a database comprising a search session and a record about a search query which is received from a user terminal during the search session, the record being generated every predetermined time interval and recorded in the database; generating total search session number information by counting a total number of search sessions which is set during the time interval, by referring to the database; generating first search session number information by counting a number of search sessions where a first search query is initially received and a second query is subsequently received during the time interval, by referring to the database; generating second search session number information by counting a number of search sessions where a third search query is received during the time interval, by referring to the database; generating third search session number information by counting a number of search sessions where the first search query and the second search query are initially received, and the third search query is subsequently received during the time interval, by referring to the database; generating conditional probability information by using the first search session number information and the third search session number information; generating correlation information by using the total search session number information, the first search session number information, the second search session number information, and the third search session number information; and determining a relation between the first search query and the second search query, and the third search query, based on the conditional probability information and the correlation information.

BRIEF DESCRIPTION OF DRAWINGS

FIG. 4 illustrates an example of a record included in a database according to an embodiment of the present invention;

FIG. 5 illustrates an example of a record where a search session and a search query are mapped into numbers according to an embodiment of the present invention;

FIG. 7 illustrates an example of a record from a second database recording a related search query according to an embodiment of the present invention.

BEST MODE FOR CARRYING OUT THE INVENTION

Figure 1:
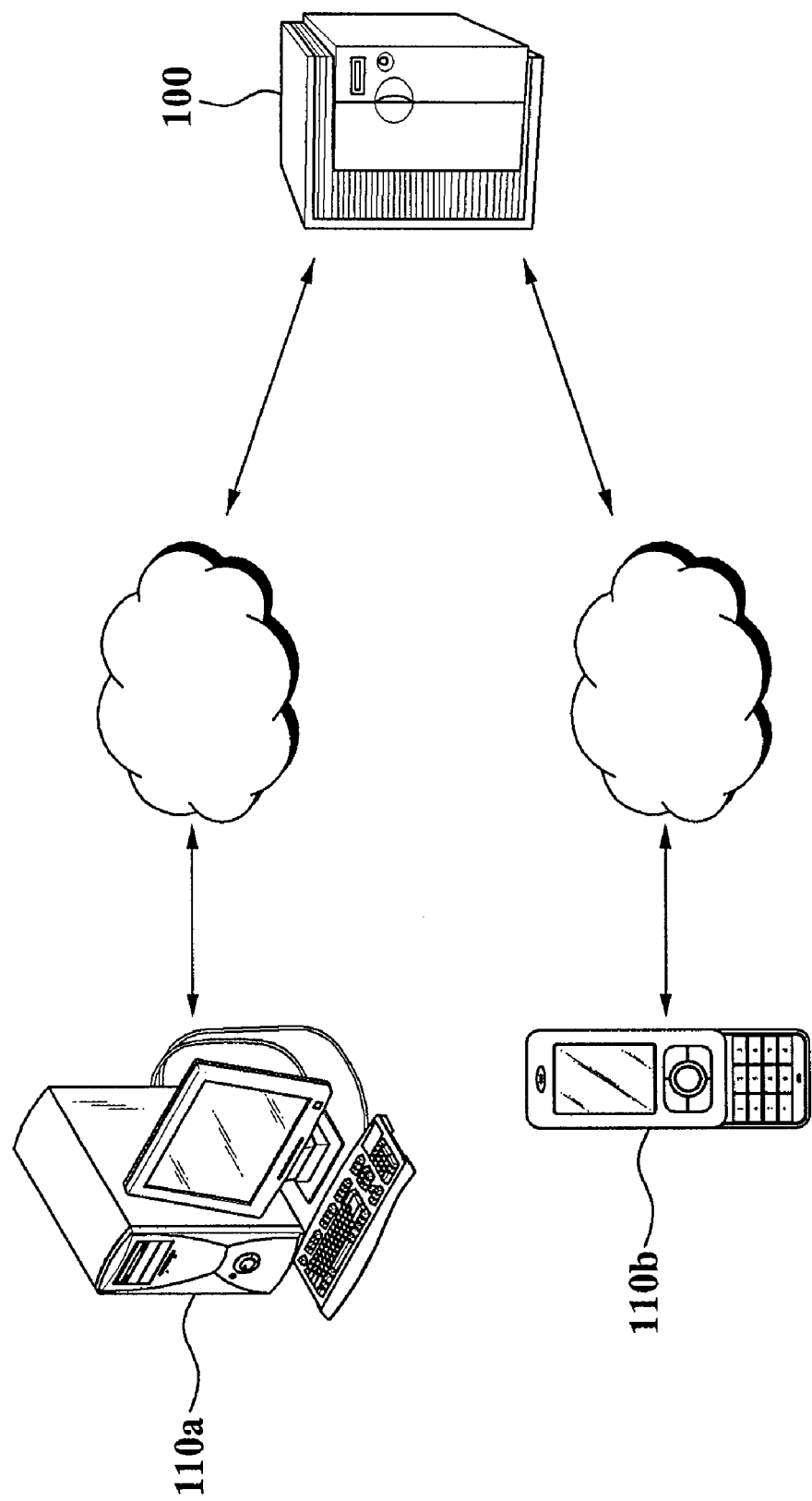
FIG. 1 illustrates a network connection of a system for determining a relation between search queries according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 illustrates a network connection of a system for determining a relation between search queries according to an embodiment of the present invention. Users access a search query relation determination system 100 via a wired/wireless network using a user terminal 110a or 110b, and input a search query. The search query relation determination system 100 transmits a related search query corresponding to the search query to the user terminal 110a or 110b. Also, the search query relation determination system 100 according to another embodiment of the present invention may further transmit ranking information and the like, based on relation index information of the related search query, to the user terminal 110a or 110b.

The search query relation determination system 100 may be integrally operated with an Internet search service system. Accordingly, when a user accesses the Internet search service system and inputs a search query, a search result of the search query may be provided to the user along with the related search query of the search query.

Figure 2:
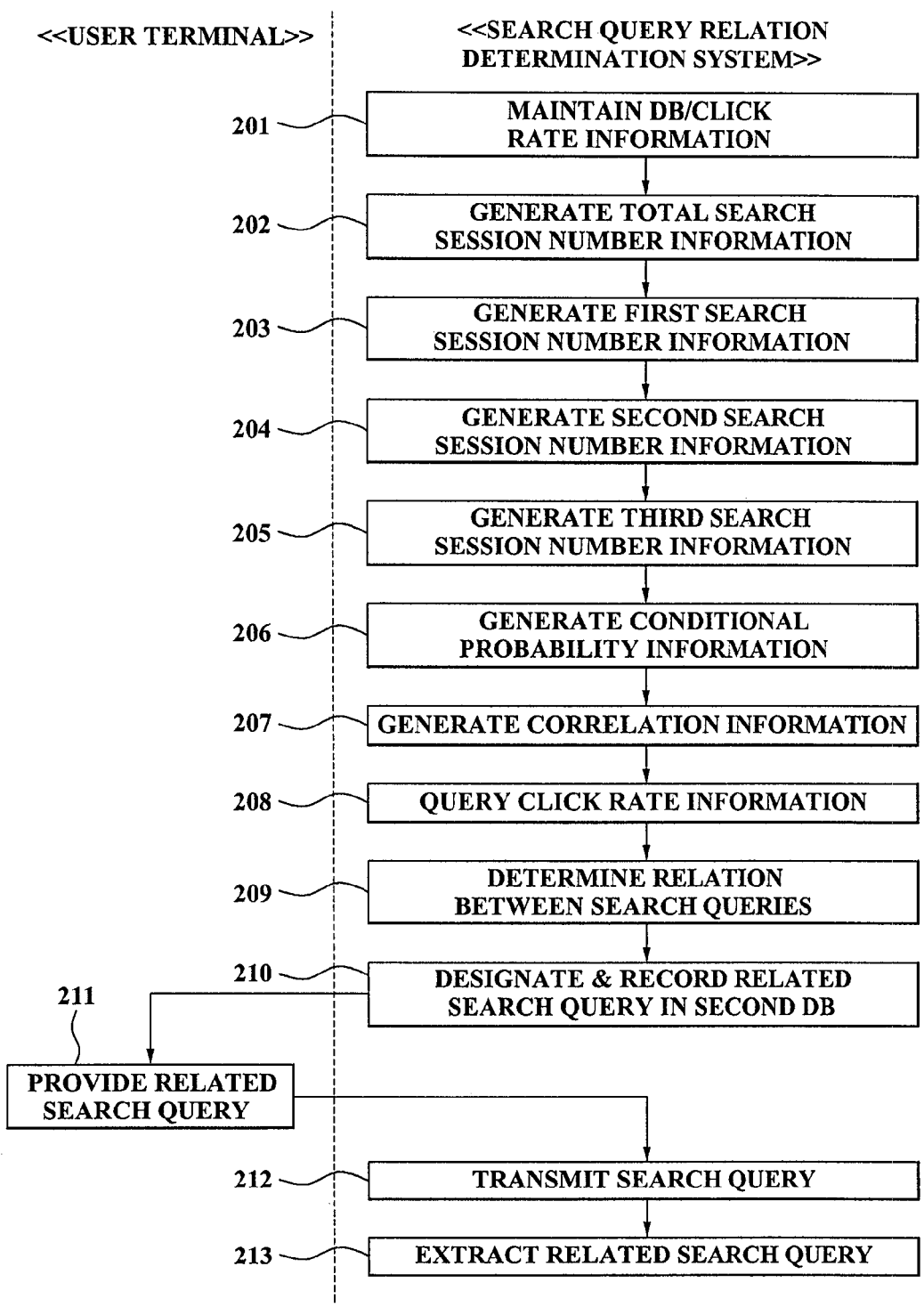
FIG. 2 is a flowchart illustrating a method of determining a relation between search queries according to an embodiment of the present invention.

FIG. 2 is a flowchart illustrating a method of determining a relation between search queries according to an embodiment of the present invention. The present embodiment relates to a method of determining a relation between queries, which can exclude a search query that is not included in a search result, but determined as a related search query since a user inputted the search query in a search session a large number of times, using click rate information of each of the search queries, and also can provide the user with a related search query that can substantially satisfy the search result, by additionally considering a click rate of each of the related search queries, when determining the relation between the search queries. The method of determining a relation between search queries according to the present embodiment may be performed by a predetermined search query relation determination system.

In operation S201, the search query relation determination system maintains a database. The database maintains a search session and a record about a search query which is received from a user terminal during the search session. Also, in operation S201, the search query relation determination system records and maintains click rate information for each of the search queries in a predetermined storage unit.

According to an embodiment of the present invention, there is provided a method of determining a relation between search queries, in which the search session is set when a search window is initially provided to the user terminal, and terminated when data is not transmitted from the user terminal during a predetermined time, and an additional search session is started when an additional search query is received from the user terminal after the search session is terminated.

In the present embodiment, the search session is a new type of search session which is set by using a different method from a conventional search session. The conventional search session designates search activities which the user performed during a predetermined time. In this case, a time from a starting time of the search session to a termination time of the search session is pre-determined. As an example, in the conventional search session setting method, when the time is 10 minutes, and the user performed searching activities during 10 minutes, the conventional search session was terminated, and searching activities of another 10 minutes after the termination are regarded to have been performed in an additional search session.

However, in the present embodiment, the search session is set when a search window is initially provided to the user terminal, and terminated when data is not transmitted from the user terminal during a predetermined time. As an example, when the time is 5 minutes, and in this state, a search window is initially opened by the user accessing a search service webpage via a user terminal, the search session starts. Also, when the user waits without performing any searching activity, such as inputting a search query or selecting a search result, for another 5 minutes from a "final time" when the user performed searching activities, the search session is terminated. Specifically, when the user waits without taking any action for another 5 minutes from the user's final search activity time, the search session is terminated. Also, when the additional search query is received from the user terminal after the termination of the search session, the additional search session starts.

When a search result using a search query does not satisfy a user, the user generally inputs another search query associated with the search query to perform searching activities. Accordingly, when the user waits without taking any action during a predetermined time from the time of the user's final searching activity, the search query relation determination system according to the present embodiment determines that the user has completed searching activities associated with a particular subject. Accordingly, when the additional search query is inputted after the time elapses, the search query relation determination system determines that the search query associated with an additional particular subject is inputted, and starts an additional session.

Also, when the user continuously performs searching activities even after a very long time elapses, the search query relation determination system determines that the user is inputting various types of search queries associated with a particular subject according to a single intention. Accordingly, in this case, the search query relation determination system does not start the additional search session, but maintains the single search session.

Compared with the conventional method of determining the time from the starting time of a search session to the determination time of the search session as a fixed time, and registering all search queries in the search session as related search queries, according to the present embodiment, the search session is defined as a new session as described above. Accordingly, the relation between search queries which are received in an identical search session can be very reliable.

Also, according to the present invention, there is provided a method and system which can more accurately determine a relation between search queries by not registering the search queries which are received in the identical search session as the related search queries, but utilizing an element which can count a number of search sessions where a pair of search queries are included, and determine a relation between the search queries.

Figure 3:
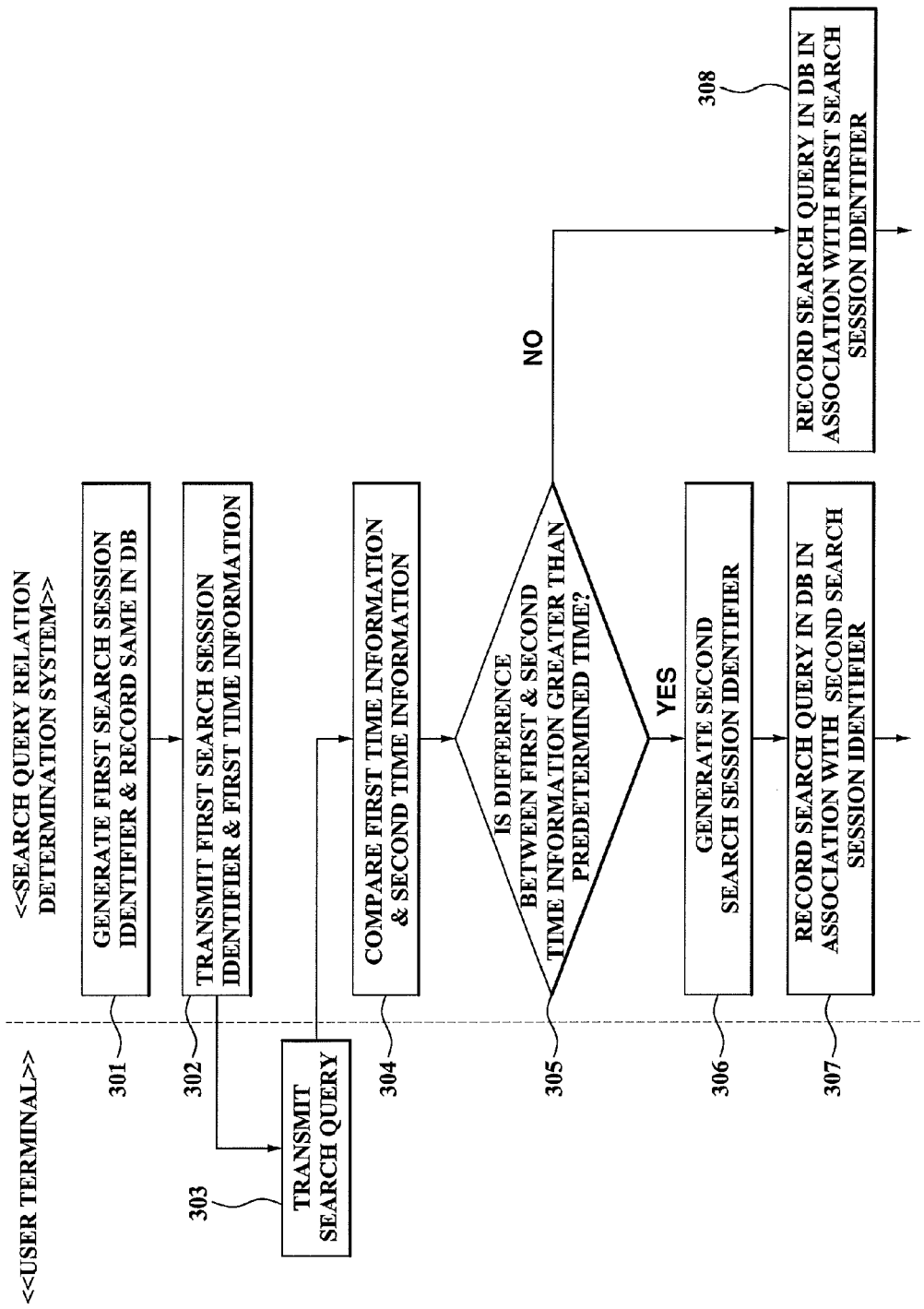
FIG. 3 is a flowchart illustrating a process of maintaining a database according to an embodiment of the present invention.

Hereinafter, an embodiment of operation 201 of maintaining the database which includes the search session and the record about the search query will be described using the newly defined search session as described above. FIG. 3 is a flowchart illustrating a process of maintaining a database according to the present embodiment.

In operation 301, a search query relation determination system according to the present embodiment generates a first search session identifier associated with a first search session, and records the generated first search session identifier in the database. Every time a user performs a searching activity, the search query relation determination system transmits the first search session identifier and time information about each search time to a user terminal. In this instance, the user terminal may store the received first search session identifier and the time information in a predetermined location of the user terminal in a form of a cookie.

In operation 302, when the user performs a final searching activity, the search query relation determination system transmits the first search session identifier and first time information about a final search time, to the user terminal. Also, the user terminal may store the received first search session identifier and the first time information in the predetermined location of the user terminal in a form of a cookie.

In operation 303, the search query relation determination system receives the search query from the user terminal. In operation 304, the search query relation determination system compares the first time information and second time information when the search query is received.

When a difference between the first time information and the second time information is determined to be greater than a predetermined time in operation 305, the search query relation determination system generates a second search session identifier associated with a second search session in operation 306. Also, in operation 307, the search query relation determination system records the second search session identifier and a record about the received search query in the database.

Also, when the difference is determined to be less than the predetermined time in operation 305, the search query relation determination system records the received search query in the database in association with the first search session identifier in operation 308.

The method of determining a relation between search queries according to the present embodiment may effectively manage the search session by maintaining the database via the systematic process described above. Also, when utilizing the effectively managed search session, the relation between the search queries which are received in the identical search session can be very reliable.

FIG. 4 illustrates an example of a record included in a database according to an embodiment of the present invention. As shown in FIG. 4, the record may include a search session identifier 401, and information about search queries which have been received from the user terminal during the search session associated with the search session identifier 401. Referring to a reference numeral 402, it can be seen that a search session identifier "sessionId1" and search queries "Parkchanho", "major league", "baseball", etc., are recorded in the record. In this instance, the search queries have been received from the user terminal during the search session assigned with the search session identifier "sessionId1"

According to an embodiment of the present invention, the search query relation determination system generates the record every predetermined time interval and records the generated record in the database. Here, the time interval may be predetermined, for example, "a day", "two days", and "a week". Also, the service operator may change an existing time interval into another time interval. According to the present embodiment, data is collected according to a certain time interval and the collected data is utilized when determining a relation between search queries. Accordingly, it is possible to continuously check the relation between the search queries which may change as a time passes. As an example, when generating the record per a day, a plurality of search sessions, where search queries "Parkchanho" and "major league" were simultaneously received, were recorded in the record two days ago, and based on the record, yesterday's search query relation determination system might determine "Parkchanho" and "major league" as related search queries. However, when almost no search session where "Parkchanho" and "major league" were simultaneously received was recorded in the record yesterday, today's search query relation determination system may determine that "Parkchanho" and "major league" are not related search queries based on the today's record. Accordingly, it is possible to provide a user with the related search queries which are extracted based on most recent data.

In operation 201 of FIG. 2, the search query relation determination system may map the search session or the received search query into numbers, and generate the record by using the mapped numbers.

FIG. 5 illustrates an example of a record where a search session and a search query are mapped into numbers according to an embodiment of the present invention. Referring to a reference numeral 501, when compared with the reference numeral 402 of FIG. 4, it can be seen that a number "56" is mapped with the search session identifier "sessionId1", and numbers "18759", "18760", and "18761" are mapped with the search queries "Parkchanho", "major league", and "baseball", respectively.

Compared with extracting a related search query by using data in a character string, in the present embodiment, each operation of the present invention is performed by using data mapped into numbers. In this case, when recording the data in the database, less memory may be used. Also, the data may be more easily processed than the character string. According, a processing speed may be improved.

According to an embodiment of the present invention, in operation 201, there is provided a method of determining a relation between search queries where a record about a particular search session and search queries received during the particular search session is not included in the database, when the number of search queries that have been received during the particular search session is greater than a predetermined numeral value. In the present embodiment, when the number of search queries is greater than the predetermined numerical value by counting the number of search queries which have occurred in a single search session, the search query relation determination system may determine that data is received in the search session, not by a general method but an unexpected method. When an extremely great number of search queries are received in the single search session, it is very unlikely that all the search queries are related search queries. Accordingly, a more accurate related search query may be extracted by not recording the data in the database.

Also, as described above, in operation 201, the search query relation determination system may record and maintain click rate information of each of the search queries in the predetermined storage unit.

An invalid search query, which does not have any search result or is not outputted, may be determined as a related search query, since a large number of users inputted the search query in an identical search session a great number of times. However, since the user does not require the search query, the search query needs to be removed from the related search queries. For this, in the present invention, the click rate information of each search query is utilized. A click occurs when a user is substantially satisfied with the search result using search query. Accordingly, the higher the click rate, it can be determined that the user is more satisfied with the search result. Accordingly, in the present invention, the click rate information may be utilized as an element for determining the relation between the search queries.

The click rate information which is recorded in the storage unit may be generated based on a ratio of a number of clicks on a search result to a number of searches of each of the search queries, and represented as, (click rate information)=(number of clicks on search result) particular query/(number of searches) particular query     <Equation 1 click rate information>

In operation 202, the search query relation determination system generates total search session number information by counting a total number of search sessions which is set during the time interval, by referring to the database. As an example, when the time interval is set as a day, the search query relation determination system may count the total number of search sessions which are set during a day.

In operation 203, the search query relation determination system generates first search session number information by counting a number of search sessions where a first search query is received during the time interval. In operation 204, the search query relation determination system generates second search session number information by counting a number of search sessions where a second search query is received during the time interval, by referring to the database. As an example, when the time interval is set as a day, the search query relation determination system may count a number of search sessions where the search query "Parkchanho" was received during a day, and the number of search sessions where the search query "major league" was received during a day.

In operation 205, the search query relation determination system generates third search session number information by counting a number of search sessions where the first search query and the second search query are received during the time interval, by referring to the database. As an example, when the time interval is set as a day, the search query relation determination system may count the number of search sessions where the search queries "Parkchanho" and "major league" were received during a day.

According to an embodiment of the present invention, there is provided a method of determining a relation between search queries in which the search query relation determination system generates the third search session number information in operation 205, only when the first search session number information and the second search session number information are greater than a predetermined numerical value. Specifically, in the present embodiment, when the first search session number information or the second search session number information is less than the predetermined numerical value, the search query relation determination system may not generate the third search session number information. Also, when the number of search sessions where each of the search queries is received is extremely small, the search queries may not be related search queries. Accordingly, when the number of search queries which are received is not greater than the predetermined numerical value, the search queries are not generated as data for determining the related search queries. Consequently, a processing speed of the search query relation determination system may be significantly improved.

According to an embodiment of the present invention, there is provided a method of determining a relation between search queries, which can use a hash-tree data structure when counting the number of search sessions in operation 205.

The hash-tree data structure is a type of data structure which is utilized for storing and retrieving data. Also, the hash-tree data structure is known as a method of retrieving a data location by using a value which is acquired by processing a desired character string with a hash function. In the hash-tree data structure, a number of data does not significantly affect a speed of retrieving the data. Accordingly, when using the hash-tree data structure, the data location may be effectively and quickly retrieved. Also, consumption of a system memory may be significantly reduced.

Figure 6:
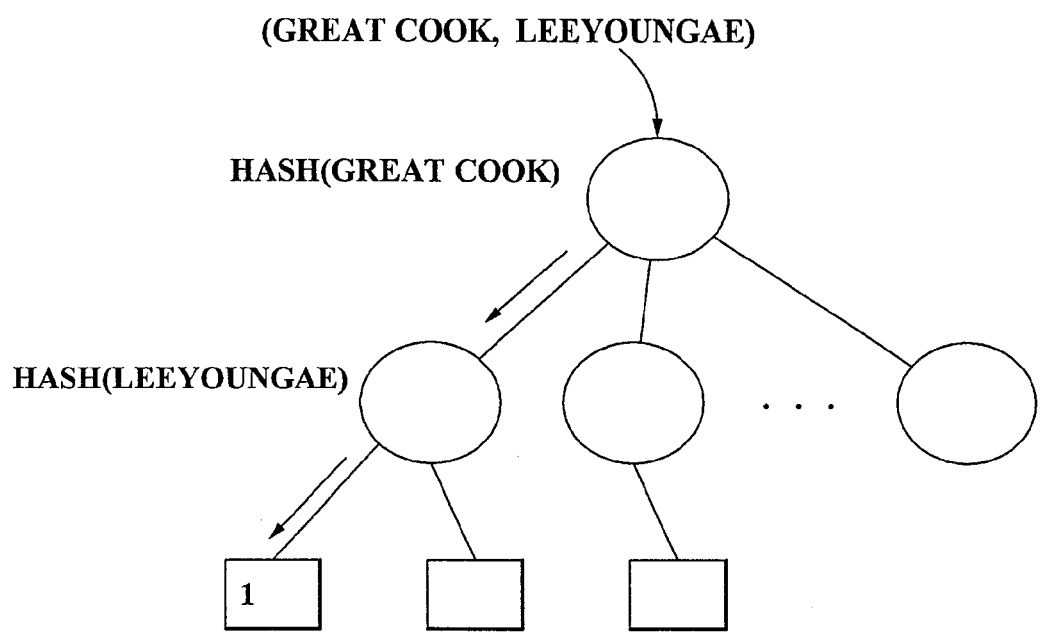
FIG. 6 illustrates an example of a hash tree data structure which is used for counting a number of search sessions according to an embodiment of the present invention.

FIG. 6 illustrates an example of a hash-tree data structure which is used for counting a number of search sessions according to an embodiment of the present invention. An example of counting the number of search sessions by using the hash-tree data structure when search sessions are a pair of search queries, "great cook" and "Leeyoungae", that exist in the database is illustrated in FIG. 6.

In operation 206, the search query relation determination system generates conditional probability information by using the first search session number information and the third search session number information.

The conditional probability information may be utilized as an element for evaluating the relation between the search queries. As an example, the relation between the search queries "great cook" and "Leeyoungae" may be determined by using probability information, as an element, that is a portion of the number of search sessions including "Leeyoungae" from the number of search sessions including "great cook". Specifically, when the search query "Leeyoungae" is included a great number of times, in the search sessions where the search query "great cook" is included, it may be utilized as an element which can greatly affect a determination of the relation between the search queries.

An example of equation which may be utilized for generating the conditional probability information is represented as, < Equation 2 conditional probability information>

$$P(A \mid B) = \frac{P(A \cap B)}{P(B)}$$

As shown in Equation 2, probability information that a search query "A" may be included in a search session where a search query "B" is included, may be generated by dividing a probability that the search queries "A" and "B" may be included in an identical search session by a probability that the search query "B" is included in the search session.

In operation 207, the search query relation determination system generates correlation information by using the total search session number information, the first search session number information, the second search session number information, and the third search session number information.

The correlation information may be utilized as another element for determining the relation between the search queries. In the case of a search query which is frequently inputted from the user, the search query may not have a substantial relation, but the generated conditional probability information may have a comparatively high value. Accordingly, when utilizing the correlation information as another element for determining the relation between the search queries, the relation between the search queries may be more accurately determined.

An independence determination is included in probability theories, and the correlation information is utilized for the independence determination. Specifically, when the correlation information has a value near 1, the correlation information may be utilized as a strong element which can determine that both search queries are not related, but independent from each other. Also, when the correlation information has a value greater than 1, the correlation information may be utilized as a strong element which can determine that both search queries are related to each other.

An example of equation which can be utilized for generating the correlation information is represented as, < Equation 3 correlation information>

$$\text{CORRELATION COEFFICIENT} = \frac{P(A \cap B)}{P(A)P(B)}$$

As shown in Equation 3, the correlation information may be generated by dividing a probability that the search queries "A" and "B" may be included in an identical search session by a value which is acquired by multiplying a probability that the search query "A" may be included in the search session and a probability that the search query "B" may be included in the search session. Also, when developing Equation 3, the correlation information is calculated into a value which is acquired by dividing a value, which is acquired by multiplying the number of search sessions where the search queries "A" and "B" are included and the total number of search sessions, by the number of search sessions where the search query "A" is included and the number of search sessions where the search query "B" is included. Accordingly, the search query relation determination system may generate the correlation information by using the total search session number information, the first search session number information, the second search session number information, and the third search session number information.

In operation 208, the search query relation determination system queries click rate information of the second search query by referring to the storage unit.

In operation 209, the search query relation determination system determines a relation between the first search query and the second search query, based on the conditional probability information, the correlation information, and the click rate information.

As an example, the search query relation determination system may calculate a predetermined index by multiplying a predetermined numerical value and each information, and adding up the results of the multiplication, and determine the relation between the search queries by using the index.

As another example, the search query relation determination system may determine the relation between the first search query and the second search query, based on a multiplication calculation value of the conditional probability information, the correlation information, and the click rate information. In this case, it is also possible to calculate a predetermined index by multiplying a predetermined numerical value and each information, and multiplying the results of the multiplications, and to determine the relation between the search queries by using the index. As described above, when determining the relation between the search queries based on the multiplication calculation value, the index is calculated to be near 0 as the click rate information approaches 0. Accordingly, the search query with a low click rate may be determined to have a weaker relation with another search query.

As another example, when the click rate information is greater than a predetermined numerical value, the search query relation determination system determines the relation between the first search query and the second search query. Also, when the click rate information is less than the predetermined numerical value, the search query relation determination system does not determine the relation between the first search query and the second search query. Accordingly, it is possible to prevent an invalid search query, which is less than the predetermined numerical value, from being provided as a related search query.

Also, it is apparent to those of ordinary skills in the related art that a method of determining a relation between search queries by using the conditional probability information, the correlation information, and the click rate information may be performed according to various embodiments.

According to an embodiment of the present invention, there is provided a method of determining a relation between search queries in which the search query relation determination system determines the relation between the search queries only when the conditional probability information is greater than the predetermined numerical value in operation 209.

In the present embodiment, when the conditional probability information is less than the predetermined numerical value and has a comparatively very low value, the search query relation determination system determines that the relation between the search queries is very low, and does not determine the relation between the search queries. Accordingly, unnecessary consumption of system memory may be reduced. Also, a processing efficiency of the system may be improved.

According to an embodiment of the present invention, there is provided a method of determining a relation between search queries in which the predetermined numerical value of the above-described embodiment changes, based on a predetermined function which decreases according to an increase of the first search session number information.

Specifically, when the first search session number information corresponds to a very low numerical value, the conditional probability information may not be normally acquired and may be much greater than a fixed predetermined numerical value. As an example, when the number of search sessions where the search queries "A" and "B" are included is "1", and the number of search sessions where the search query "A" is included is "5", the conditional probability information is calculated as "1/5", i.e. a comparatively very high numerical value may be recorded. In this case, although the relation between the search queries "A" and "B" is substantially low, the relation may be recognized and consequently, an inaccurate related search query may be provided to the user. Accordingly, as described with the present embodiment, it is required to change the predetermined numerical value according to the first search session number information. Accordingly, a more accurate related search query may be provided to the user.

According to an embodiment of the present invention, there is provided a method of determining a relation between search queries in which the predetermined function has a percentage value which is acquired by dividing 100 percent ("1" as a value) by a square root of the first search session number information, as a function value. According to the present embodiment, the function may be represented as "100/√(root) first search session number information".

According to another embodiment of the present invention, the predetermined function may be represented as, $$y(\%) = a * x^{-b} \qquad \text{<Equation 4 function>}$$

In Equation 4, y designates the predetermined numerical number, and x designates the first search session number information. Also, constant a and a power b may be acquired via an experimental process of inducing an optimal equation for acquiring the numerical value. As an example, the constant a may be 80 and the power b may be 1.

A method of determining a relation between search queries according to an embodiment of the present invention determines the relation only when the conditional probability information is greater than the predetermined numerical value. Specifically, according to the above-described embodiments, as the first search session number information has a lower numerical value, the predetermined numerical value increases. Accordingly, the search query relation determination system may not determine the relation between the queries. Consequently, unnecessary consumption of system memory may be reduced. Also, a processing efficiency of the system may be improved.

According to an embodiment of the present invention, there is provided a method of determining a relation between search queries in which the search query relation determination unit determines the relation between the search queries in operation 209, only when the correlation information is greater than the predetermined numerical value.

In the present embodiment, when the correlation information is less than the predetermined numerical value and has a comparatively small numerical value (for example, when the correlation information approaches "1"), the search query relation determination system does not determine the relation between the search queries. Accordingly, unnecessary consumption of system memory may be reduced. Also, a processing efficiency of the system may be improved.

In a method of determining a relation between search queries according to an embodiment of the present invention, when it is determined that both search queries are related to each other, the search query relation determination system records the relation between the both search queries, and performs a toggle error check. Accordingly, a more accurate related search query may be extracted. Hereinafter, the present embodiment will be described.

A toggle key of a keyboard generally designates a key which enables at least two functions with a single key. Examples of the toggle key include an "Insert" key, a "Korean/English" key, a "Caps Lock" key, a "Num Lock" key, a "Scroll Lock", and the like.

The "toggle error check" used throughout the present specification designates a check associated with the "Korean/English" key among the above toggle keys. As an example, a user who desires to input ""다음"" via a Hangul keyboard, may input "ekdma" via an English keyboard according to the setting of the "Korean/English" key. As described above, in many cases, the user may input a Hangul search query via an English keyboard or may input an English search query via a Hangul keyboard. In this case, the user is required to re-input a correct search query. Specifically, since an original search query and a toggled error search query may be included in an identical search session, a relation between the original search query and the toggled error search query may be recognized. In the above example, the toggle error of "다음", "ekdma", may be designated as the related search query of "다음".

When an unrelated search query is designated as the related search query due to the toggle error, system memory may be unnecessarily consumed to record the unrelated search query and a processing speed of the system may be decreased. Also, since an inaccurate related search query is provided to the user, reliability of the search service may be deteriorated. However, the search query relation determination system according to the present embodiment may solve the aforementioned disadvantage by performing the toggle error check.

When the first search query and the second search query are determined to be related to each other in operation 209, the search query relation determination system according to the present embodiment may designate the first search query and the second search query as the related search queries, and record the first search query and the second search query in a second database.

Also, the search query relation determination system may perform the toggle error check with respect to the first search query and the second search query by referring to the second database. According to an embodiment of the present invention, the search query relation determination system may perform the toggle error check by using a morphemic analysis.

As a result of the toggle error check, when the first search query and the second search query has a toggle error relation, the search query relation determination system may delete the record associated with designating of the related search query from the second database.

Hereinafter, a method of determining a relation between search queries according to another embodiment of the present invention will be described with reference again to FIG. 2. Also, the method of determining a relation between search queries according to the present embodiment may be performed by a predetermined search query relation determination system.

According to the present embodiment, there is provided a method of determining a relation between search queries, in which a target for a relation determination is expanded, and when determining a relation between a search query and another search query, a previously inputted search query before the search queries, is considered. Accordingly, it is possible to provide a different related search query with respect to an identical search query as the user's query input progresses by determining a relation among at least three search queries.

In the above-described embodiment, the relation between two search queries, for example, "great cook" and "Leeyoungae", was determined. However, in the present embodiment, the relation among at least three search queries is determined by analyzing data about which search query has been retrieved after the search queries "great cook" and "Leeyoungae" were retrieved. As an example, the data analysis result determines that more users inputted the search queries in an order of "great cook" and "Leeyoungae", and subsequently inputted a search query "Jijinhee", and also determines that more users inputted search queries in an order of "mamonde" and "Leeyoungae", and subsequently inputted a search query "cosmetics". In this case, when considering the relation between only two search queries, the search queries "Leeyoungae" and "Jijinhee" are more related to each other than the search queries "Leeyoungae" and "cosmetics". However, when the user inputted the search query "mamonde" before inputting the search query "Leeyoungae", the search query relation determination system according to the present embodiment provides the search query "cosmetics" as the related search query, not the search query "Jijinhee".

Hereinafter, an entire configuration will be described.

In operation 201, the search query relation determination system according to the present invention maintains a database. The database maintains a search session and a record about a search query which is received from a user terminal during the search session.

According to an embodiment of the present invention, the search query relation determination system generates the record every predetermined time interval and records the generated record in the database. Here, the time interval may be predetermined, for example, "a day", "two days", and "a week". Also, the service operator may change an existing time interval into another time interval. According to the present embodiment, data is collected according to a certain time interval and the collected data is utilized when determining a relation between search queries. Accordingly, it is possible to continuously check the relation between the search queries which may change as a time passes.

In operation 201, the search query relation determination system records and maintains click rate information for each of search queries in a predetermined storage unit.

In operation 202, the search query relation determination system generates total search session number information by counting a total number of search sessions which is set during the time interval, by referring to the database. As an example, when the time interval is set as a day, the search query relation determination system may count the total number of search sessions which are set during a day.

In operation 203, the search query relation determination system generates first search session number information by counting a number of search sessions where a first search query is initially received and a second query is subsequently received during the time interval, by referring to the database. In this case, the search query relation determination system may generate the first search session number information by counting the number of search sessions where the first search query and the second search query are sequentially received during the time interval.

In operation 204, the search query relation determination system generates second search session number information by counting a number of search sessions where a third search query is received during the time interval, by referring to the database.

In operation 205, the search query relation determination system generates third search session number information by counting a number of search sessions where the first search query and the second search query are initially received, and the third search query is subsequently received during the time interval, by referring to the database. In this case, the search query relation determination system may generate the third search session number information by counting the number of search sessions where the first search query, the second search query, and the third search query are sequentially received during the time interval.

In operation 206, the search query relation determination system generates conditional probability information by using the first search session number information and the third search session number information.

In operation 207, the search query relation determination system generates correlation information by using the total search session number information, the first search session number information, the second search session number information, and the third search session number information.

In operation 208, the search query relation determination system queries click rate information of the third search query by referring to the storage unit.

In operation 209, the search query relation determination system determines a relation between the first search query and the second search query, and the third search query, based on the conditional probability information and the correlation information. In this case, the search query relation determination system may generate relation index information between the first query and the second query, and the third query, by using the conditional probability information, the correlation information, and the click rate information.

According to an embodiment of the present invention, the search query relation determination system may determine a relation between search queries, and record the same, and provide a user with a related search query by using the relation between search queries. A method of determining a relation between search queries according to the present embodiment of the present invention may further include operations 209 through 212.

In operation 210, the search query relation determination system selects and sorts a predetermined number of third search queries according to a descending order of the relation index information, and records the predetermined number of third search queries as a related search query corresponding to the first search query and the second search query, in the second database.

FIG. 7 illustrates an example of the second database. The second database may record the first search query and the second search query as a previous search query and a current search query respectively, as indicated by a reference numeral 701, and record the predetermined number of related search queries, for example, a related term 1, related term 2, a related term 3, etc., as indicated by a reference numeral 702. Referring to a reference numeral 703, "dodgers", "major league", "baseball", etc., are recorded in the second database, as the related search queries corresponding to the first query and the second search query, "Parkchanho, texas". It may indicate that the search queries that the user may input after sequentially inputting the search queries "Parkchanho" and "texas" are in an order of "dodgers", "major league", "baseball", etc.

In operation 211, the search query relation determination system receives the second search query after receiving the first search query, from a user terminal.

In operation 212, the search query relation determination system extracts the related search query corresponding to the first search query and the second query by referring to the second database.

In operation 213, the search query relation determination system provides the extracted related search query to the user terminal.

As described above, according to the present invention, there is provided a method of determining a relation between search queries, in which a target for a relation determination is expanded, and, when determining a relation between a search query and another search query, a previously inputted search query before the search queries is considered. Accordingly, it is possible to provide a different related search query, with respect to an identical search query as the user's query input progresses, by determining a relation among at least three search queries.

The embodiments of the present invention may be recorded in computer-readable media including program instructions to implement various operations embodied by a computer.

The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Hereinafter, a search query relation determination system according to another embodiment of the present invention will be described.

Figure 8:
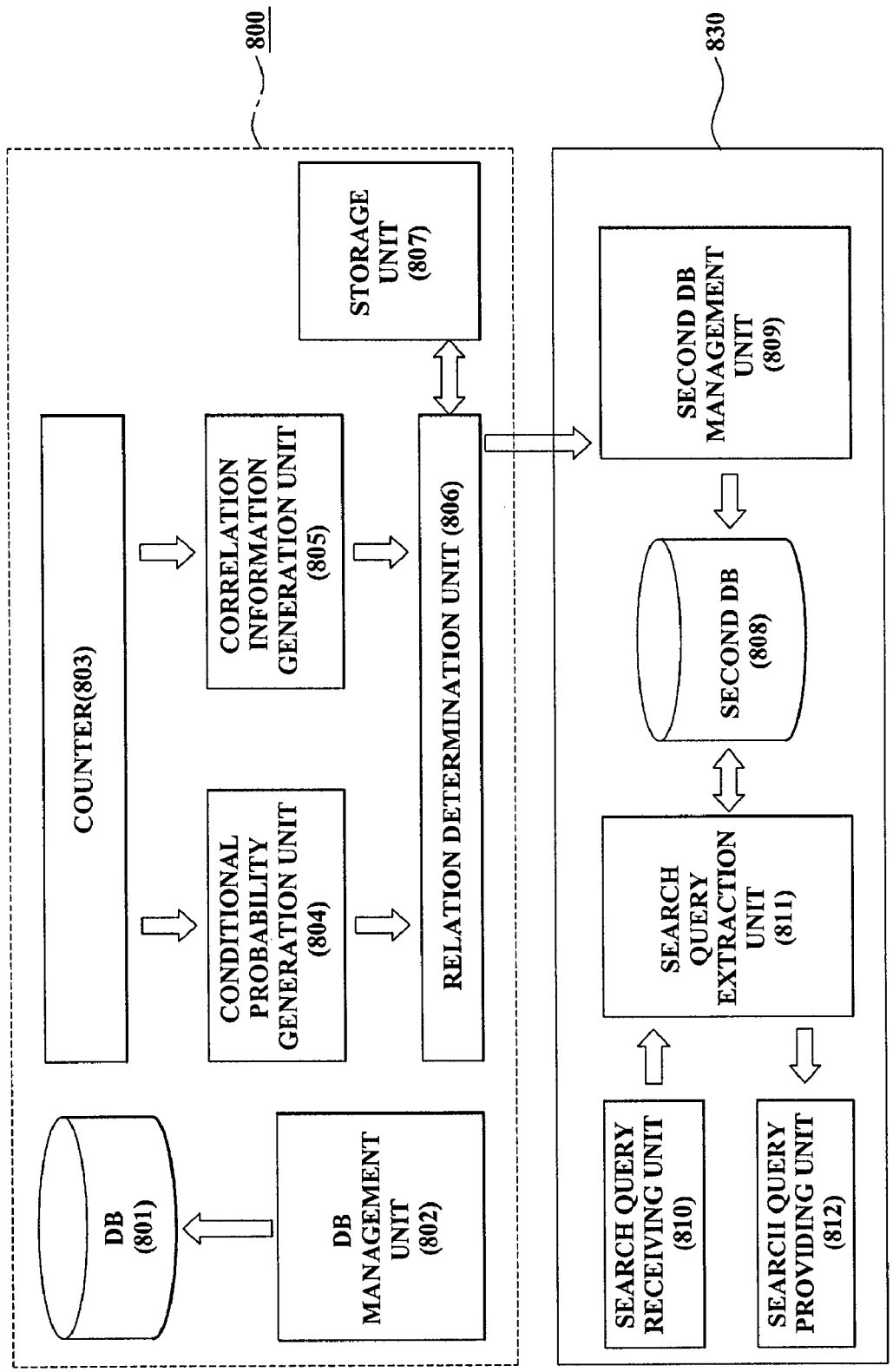
FIG. 8 is a block diagram illustrating a system for determining a relation between search queries according to an embodiment of the present invention.

FIG. 8 is a block diagram illustrating a system for determining a relation between search queries according to an embodiment of the present invention. A search query relation determination system 800 according to the present embodiment includes a database 801, a database management unit 802, a counter 803, a conditional probability information generation unit 804, a correlation information generation unit 805, a relation determination unit 806, and a storage unit 807.

The database 801 maintains a search session and a record about a search query which is received from a user terminal during the search session.

The search session is set when a search window is provided to the user terminal, and terminated when data is not transmitted from the user terminal during a predetermined time. Also, an additional search session is started when an additional search query is received from the user terminal after the search session is terminated.

FIG. 3 is a flowchart illustrating a process of maintaining the database 801, and FIG. 4 illustrates an example of a record included in the database 801. FIGS. 3 and 4 have been described in the above-described embodiments, and thus, will be omitted here.

According to an embodiment of the present invention, the search query relation determination system 800 may map the search session or the received search query into numbers, and maintain the database 801 which includes a record generated by using the mapped numbers. FIG. 5 illustrates an example of a record where a search session and a search query are mapped into numbers, and a description related thereto has been described above. Thus, further detailed description related thereto will be omitted here.

The database management unit 802 generates the record per a predetermined time interval and records the generated record in the database 801.

The storage unit 807 records and maintains click rate information for each of the search queries.

The counter 803 generates total search session number information by counting a total number of search sessions which is set during the time interval, generates first search session number information by counting a number of search sessions where a first search query is received during the time interval, and generates second search session number information by counting a number of search sessions where a second search query is received during the time interval, and generates third search session number information by counting a number of search sessions where the first search query and the second search query are received during the time interval, by referring to the database 801.

According to an embodiment of the present invention, the counter 803 may utilize a hash-tree data structure when counting the number of search sessions.

The hash-tree data structure is a type of data structure which is utilized for storing and retrieving data. Also, the hash-tree data structure is know as a method of retrieving a data location by using a value which is acquired by processing a desired character string with a hash function. FIG. 6 illustrates an example of a hash-tree data structure which is used for counting a number of search sessions according to the present embodiment, and description related thereto has been described above. Thus, further detailed description related thereto will be omitted here.

The conditional probability generation unit 804 generates conditional probability information by using the first search session number information and the third search session number information The correlation information generation unit 805 generates correlation information by using the total search session number information, the first search session number information, the second search session number information, and the third search session number information.

The relation determination unit 806 queries click rate information of the second search query by referring to the storage unit 807, and determines a relation between the first search query and the second search query, based on the conditional probability information, the correlation information, and the click rate information.

According to an embodiment of the present invention, the relation determination unit 806 determines the relation between the first search query and the second search query, when the conditional probability information is greater than a predetermined numerical value, and the numerical value changes based on a predetermined function which decreases according to an increase of the first search session number information.

Specifically, when the first search session number information corresponds to a very low numerical value, the conditional probability information may not be normally acquired and may be much greater than a fixed predetermined numerical value. As an example, when the number of search sessions where the search queries "A" and "B" are included is "1", and the number of search sessions where the search query "A" is included is "5", the conditional probability information is calculated as "1/5", i.e. a comparatively very high numerical value may be recorded. In this case, although the relation between the search queries "A" and "B" is substantially low, the relation may be recognized and consequently, an inaccurate related search query may be provided to the user. Accordingly, as described with the present embodiment, it is required to change the predetermined numerical value according to the first search session number information. Accordingly, a more accurate related search query may be provided to the user.

Hereinafter, a system for determining a relation between search queries according to another embodiment of the present invention will be described with reference again to FIG. 8.

The search query relation determination system 800 according to the present embodiment also includes the database 801, the database management unit 802, the counter 803, the conditional probability information generation unit 804, the correlation information generation unit 805, the relation determination unit 806, and the storage unit 807.

The database 801 maintains a search session and a record about a search query which is received from a user terminal during the search session.

The database management unit 802 generates the record per a predetermined time interval and records the generated record in the database 801.

The storage unit 807 records and maintains click rate information for each of the search queries.

The counter 803 generates total search session number information by counting a total number of search sessions which is set during the time interval, generates first search session number information by counting a number of search sessions where a first search query is initially received and a second query is subsequently received during the time interval, generates second search session number information by counting a number of search sessions where a third search query is received during the time interval, and generates third search session number information by counting a number of search sessions where the first search query and the second search query are initially received, and the third search query is subsequently received during the time interval, by referring to the database 801.

In this case, the counter 803 may generate the first search session number information by counting the number of search sessions where the first search query and the second search query are sequentially received during the time interval. Also, the counter 803 may generate the third search session number information by counting the number of search sessions where the first search query, the second search query, and the third search query are sequentially received during the time interval.

The conditional probability information unit 804 generates conditional probability information by using the first search session number information and the third search session number information.

The correlation information generation unit 805 generates correlation information by using the total search session number information, the first search session number information, the second search session number information, and the third search session number information.

The relation determination unit 806 queries the click rate information of the third search query by referring to the storage unit 807, and determines the relation between the first search query and the second search query, and the third search query, based on the conditional probability information, the correlation information, and the click rate information. In this case, the relation determination unit 806 may generate relation index information between the first query and the second query, and the third query, by using the conditional probability information, the correlation information, and the click rate information.

According to another embodiment of the present invention, there is provided a system which can determine and record a relation between search queries, and provide a user with a related search query by using the record. The system according to the present embodiment may further include predetermined devices corresponding to a reference numeral 830.

The reference numeral 830 indicates a second database 808, a second database management unit 809, a search query receiving unit 810, a search query extraction unit 811, and a search query providing unit 812.

The second database 808 includes a record about a related search query. FIG. 7 illustrates an example of the second database 808. Description related thereto has been described above, and thus, further detailed description related thereto will be omitted here.

The second database management unit 809 selects and sorts a predetermined number of third search queries according to a descending series of the relation index information, and records the predetermined number of third search queries as a related search query corresponding to the first search query and the second search query, in the second database 808.

The search query receiving unit 810 receives the second search query after receiving the first search query, from a user terminal.

The search query extraction unit 811 extracts the related search query corresponding to the first search query and the second query by referring to the second database 808.

The search query providing unit 812 provides the extracted related search query to the user terminal.

As described above, according to the present embodiment, there is provided a system for determining a relation between search queries, in which a target for a relation determination is expanded, and, when determining a relation between a search query and another search query, a previously inputted search query before the search queries is considered. Accordingly, it is possible to provide a different related search query, with respect to an identical search query as the user's query input progresses, by determining a relation among at least three search queries.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

As used in this application, the term "unit" is intended to refer to, but is not limited to, a software or hardware component, which performs certain tasks. A unit or component may advantageously be configured to reside on the addressable storage medium and configured to execute on one or more processors. Thus, a unit or component may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims.

INDUSTRIAL APPLICABILITY

According to the present invention, there is provided a method and system for determining a relation between search queries, which can reduce temporal losses and economic losses that may be caused to a service operator, by constructing a system, and classifying and storing other search queries associated with a search query via the system. Here, the system can effectively collect and analyze data about the search query inputted from the user, and automatically determine the relation between the search queries.

Also, according to the present invention, there is provided a method and system for determining a relation between search queries, which can exclude a search query that is not included in a search result, but determined as a related search query since a user inputted the search query in a search session a large number of times, using click rate information of each of the search queries, and also can provide the user with a related search query that can substantially satisfy the search result, by additionally considering a click rate of each of the related search queries, when determining the relation between the search queries.

Also, according to the present invention, there is provided a method and system for determining a relation between search queries, which can consider a previously inputted search query before a search query and another search query were inputted, when expanding a target for a relation determination, and determining the relation between the certain search query and another search query, and thereby can determine a relation among at least three search queries, and provide a user with a different related search query even with respect to an identical search query, as the user's query input progresses.

Also, according to the present invention, there is provided a method and system for determining a relation between search queries, which can systematically calculate relation index information between search queries, and when a search query is inputted from a user, can extract a more related search query by using the relation index information, and preferentially provide the user with the extracted search query.

Also, according to the present invention, there is provided a method and system for determining a relation between search queries, which can extract a related search query that has a substantial meaning relation with a search query and thereby, provide a user with a high quality related search query service, by extracting only systematically preprocessed useful data that users searched, and maintaining an appropriate number of related search queries.

The invention claimed is:

1. A method of determining a relation between search queries, the method comprising:
   maintaining a database that associates a search session with at least one search query which has been received from a user terminal during said search session, wherein the database is updated at predetermined time intervals, said database being stored in a memory;
   determining a total number of search sessions for each user terminal during a first time interval, by referring to said database;
   determining a first number of search sessions where a first search query is received from said each user terminal during said first time interval, by referring to said database;
   determining a second number of search sessions where a second search query is received from said each user terminal during said first time interval, by referring to said database;
   determining a third number of search sessions where both said first search query and said second search query are received from said each user terminal during said first time interval, by referring to said database;
   calculating conditional probability from comparing said determined first number of search sessions where said first search query is received with said determined third number of search sessions where both said first search query and said second search query are received;
   calculating correlation by using said total number of search sessions, said first number of search sessions, said second number of search sessions, and said third number of search sessions; and
   determining a relation between said first search query and said second search query, based, at least in part, upon said calculated conditional probability and said calculated correlation,
   wherein said steps of calculating conditional probability and calculating correlation are performed by a processor.

2. The method of claim 1, further comprising:
   storing click rate information for each of search queries in a computer-readable memory; and
   wherein said relation between said first search query and said second search query is determined based, at least in part, upon said calculated conditional probability, said calculated correlation, and stored click rate information of said second search query.

3. The method of claim 2, wherein said click rate information is generated in accordance with a ratio of a number of clicks on a search result to a number of searches of each of the search queries.

4. The method of claim 2, wherein the relation between said first search query and said second search query is determined based, at least in part, upon a value which is acquired by multiplying said conditional probability information, said correlation information, and said click rate information.

5. The method of claim 1, wherein a close relation between said first search query and said second search query is determined if the click rate information is greater than a predetermined numerical value.

6. The method of claim 1, wherein a close relation between said first search query and said second search query is determined if the conditional probability information is greater than a predetermined numerical value, and the numerical value changes in accordance with a predetermined function which decreases according to an increase of the first search session number information.

7. The method of claim 1, wherein the search session is set when a search window is initially provided to the user terminal, and terminated when data is not transmitted from the user terminal during a predetermined time, and
   an additional search session is started when an additional search query is received from the user terminal after the search session is terminated.

8. The method of claim 1, wherein the maintaining the database comprises:
   generating a first search session identifier associated with a first search session, and recording the generated first search session identifier in the database;
   transmitting the first search session identifier and first time information about a final search time, to the user terminal;
   receiving the search query from the user terminal;
   comparing the first time information and second time information when the search query is received; and
   generating a second search session identifier associated with a second search session, and recording the second search session identifier and a record about the received search query in the database when a difference between the first time information and the second time information is greater than a predetermined time, and recording the record about the received search query in the database in association with the first search session identifier, when the difference is less than the predetermined time.

9. A method of determining a relation between search queries, the method comprising:
   maintaining a database that associates a search session with at least one search query which has been received from a user terminal during said search session, wherein the database is updated at predetermined time intervals, said database being stored in a memory;
   determining a total number of search sessions for each user terminal during a first time interval, by referring to said database;
   determining a first number of search sessions where a first search query is initially received and a second query is subsequently received from said each user terminal during said time interval, by referring to said database;
   determining a second number of search sessions where a third search query is received from said each user terminal during said time interval, by referring to said database;
   determining a third number of search sessions where said first search query and said second search query are initially received, and said third search query is subsequently received from said each user terminal during said time interval, by referring to said database;
   calculating conditional probability from comparing said determined first number of search sessions with said determined third number of search sessions;
   calculating correlation by using said total number of search sessions, said first number of search sessions, said second number of search sessions, and said third number of search sessions; and
   determining a relation between said first search query, said second search query and said third search query based, at least in part, upon said calculated conditional probability and said calculated correlations,
   wherein said steps of calculating conditional probability and calculating correlation are performed by a processor.

10. The method of claim 9, wherein the step of determining the first number of search sessions comprises counting the number of search sessions where said first search query and said second search query are sequentially received during said time interval.

11. The method of claim 10, wherein the step of determining the third number of search sessions comprises counting the number of search sessions where said first search query, said second search query, and said third search query are sequentially received during said time interval.

12. The method of claim 9, further comprising:
   maintaining click rate information for each of the search queries in a predetermined storage unit; and
   querying the click rate information of the third search query by referring to the storage unit,
   wherein close relation between said first search query, said second search query, and said third search query is determined based, at least in part, upon the conditional probability information, the correlation information, and the click rate information.

13. The method of claim 9, wherein the step of determining the relation further comprises:
   generating relation index information between the first query and the second query, and the third query, by using the conditional probability information, the correlation information, and the click rate information.

14. The method of claim 13, further comprising:
   selecting and sorting a predetermined number of third search queries according to a descending series of the relation index information, and recording the predetermined number of third search queries as a related search query corresponding to the first search query and the second search query, in a second database;
   receiving the second search query after receiving the first search query, from a user terminal;
   extracting the related search query corresponding to the first search query and the second query by referring to the second database; and
   providing the extracted related search query to the user terminal.

15. The method of claim 9, wherein a close relation between said first search query, said second search query and said third search query is determined when the conditional probability information is greater than a predetermined numerical value, and the numerical value changes based on a predetermined function which decreases according to an increase of the first search session number information.

16. The method of claim 9, wherein the search session is set when a search window is initially provided to the user terminal, and terminated when data is not transmitted from the user terminal during a predetermined time, and
   an additional search session is started when an additional search query is received from the user terminal after the search session is terminated.

17. The method of claim 9, wherein the maintaining the database comprises:
   generating a first search session identifier associated with a first search session, and recording the generated first search session identifier in the database;
   transmitting the first search session identifier and first time information about a final search time, to the user terminal;
   receiving the search query from the user terminal;
   comparing the first time information and second time information when the search query is received; and
   generating a second search session identifier associated with a second search session, and recording the second search session identifier and a record about the received search query in the database when a difference between the first time information and the second time information is greater than a predetermined time, and recording the record about the received search query in the database in association with the first search session identifier, when the difference is less than the predetermined time.

18. A system for determining a relation between search queries, the system comprising:
- a database for maintaining a search session associated with at least one search query which has been received from a user terminal during the search session, wherein the database is updated at predetermined time intervals;
- a counter configured for counting a total number of search sessions for each user terminal during a time interval, a first number of search sessions where a first search query is received from said each user terminal during the time interval, a second number of search sessions where a second search query is received from said each user terminal during the time interval, and a third number of search sessions where the first search query and the second search query are received from said each user terminal during the time interval, by referring to the database;
- a conditional probability generation unit configured for calculating conditional probability from comparing said first number of search sessions with said third number of search sessions;
- a correlation information generation unit configured for calculating correlation by using the total number of search sessions, the first number of search sessions, the second number of search sessions, and the third number of search sessions; and
- a relation determination unit configured for determining a relation between the first search query and the second search query based, at least in part, upon the conditional probability and the correlation.

19. The system of claim 18, further comprising:
- a computer-readable memory for storing click rate information for each of search queries, wherein said relation between said first search query and said second search query is determined based, at least in part, upon said calculated conditional probability, said calculated correlation, and stored click rate information of said second search query.

20. The system of claim 18, wherein a close relation between the first search query and the second search query is determined when the conditional probability is greater than a predetermined numerical value, and the numerical value changes based on a predetermined function which decreases according to an increase of the first number of search sessions.

21. The system of claim 18, wherein the search session is set when a search window is provided to the user terminal, and terminated when data is not transmitted from the user terminal during a predetermined time, and
- an additional search session is started when an additional search query is received from the user terminal after the search session is terminated.

22. A system for determining a relation between search queries, the system comprising:
- a database for maintaining a search session associated with at least one search query which has been received from a user terminal during the search session, wherein the database is updated at predetermined time intervals;
- a counter configured for counting a total number of search sessions for each user terminal during a time interval, a first number of search sessions where a first search query is initially received and a second query is subsequently received from said each user terminal during the time interval, a second number of search sessions where a third search query is received from said each user terminal during the time interval, and a third number of search sessions where the first search query and the second search query are initially received, and the third search query is subsequently received from said each user terminal during the time interval, by referring to the database;
- a conditional probability information unit configured for calculating conditional probability from comparing said first number of search sessions with said third number of search sessions;
- a correlation information generation unit configured for calculating correlation by using the total number of search sessions, the first number of search sessions, the second number of search sessions, and the third number of search sessions; and
- a relation determination unit configured for determining a relation between the first search query and the second search query, and the third search query based, at least in part, upon the conditional probability and the correlation.

23. The system of claim 22, wherein the counter determines the first number of search sessions where the first search query and the second search query are sequentially received during the time interval, and determines the third number of search sessions where the first search query, the second search query, and the third search query are sequentially received during the time interval.

24. The system of claim 22, further comprising:
- a computer-readable memory for storing click rate information for each of search queries,
- wherein said relation between said first search query, said second search query, and third search query is determined based, at least in part, upon said conditional probability, said correlation, and stored click rate information of said second search query.

25. The system of claim 22, wherein a close relation between the first search query and the second search query, and the third search query is determined when the conditional probability is greater than a predetermined numerical value, and the numerical value changes based on a predetermined function which decreases according to an increase of the first number of search sessions.

26. The system of claim 22, wherein the search session is set when a search window is provided to the user terminal, and terminated when data is not transmitted from the user terminal during a predetermined time, and
- an additional search session is started when an additional search query is received from the user terminal after the search session is terminated.

* * * * *